United States Patent
Delavari-Maraghi et al.

(10) Patent No.: US 12,519,870 B2
(45) Date of Patent: Jan. 6, 2026

(54) SYSTEM AND METHOD FOR TRANSITIONING COMPUTING OPERATIONS

(71) Applicant: The Toronto-Dominion Bank, Toronto (CA)

(72) Inventors: Syrous Delavari-Maraghi, Vaughan (CA); Ezhilarasan Dhandapani, Toronto (CA); Gary Wayne Moyer, Landenberg, PA (US); Prasadu Mannepalli, Brampton (CA); Ryan William O'Shaughnessy, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/616,297

(22) Filed: Mar. 26, 2024

(65) Prior Publication Data
US 2025/0310419 A1  Oct. 2, 2025

(51) Int. Cl.
*G06F 15/16* (2006.01)
*H04L 41/5019* (2022.01)
*H04L 67/60* (2022.01)

(52) U.S. Cl.
CPC .......... *H04L 67/60* (2022.05); *H04L 41/5019* (2013.01)

(58) Field of Classification Search
CPC ............................ H04L 67/60; H04L 41/5019
See application file for complete search history.

(56) References Cited

U.S. PATENT DOCUMENTS 10,983,769 B2    4/2021   White
11,010,400 B1 *  5/2021   Jain ...................... G06F 16/27
(Continued)

FOREIGN PATENT DOCUMENTS

CN    111309454 A    6/2020
CN    115438323 A    12/2022
(Continued)

OTHER PUBLICATIONS

Treichavský, Richard; API Gateways and Microservice Architectures; Master's Thesis, Department of Electronic Systems, Innovative Communication Technologies and Entrepreneurship, Aalborg University Copenhagen; Aug. 6, 2021; https://projekter.aau.dk/projekter/files/440058300/master_thesis.pdf.
(Continued)

*Primary Examiner* — Duyen M Doan
(74) *Attorney, Agent, or Firm* — CPST Intellectual Property Inc.; Brett J. Slaney; Amy Scouten

(57) ABSTRACT

A system, method, and computer readable medium (CRM) for transitioning a computer integration system are disclosed. Illustratively, the method includes providing an integration layer having an interface positioned between a plurality of consumer applications and a plurality of backend services. The interface is for performing a plurality of functionalities. The method includes providing a target integration scheme to decompose the interface, the target integration scheme comprising a plurality of groupings. For at least one grouping of the plurality of groupings, the method includes providing a service that implements a subset of the plurality of functionalities. The method includes updating the interface to handle requests for the subset via activating the service.

20 Claims, 11 Drawing Sheets

(56)     References Cited

U.S. PATENT DOCUMENTS

| | | | |
|---|---|---|---|
| 11,057,393 | B2 | 7/2021 | Coffing |
| 11,374,828 | B2 | 6/2022 | White |
| 11,445,035 | B2 | 9/2022 | Duggal et al. |
| 11,714,689 | B2 * | 8/2023 | Kiefer .................. G06F 9/4881 |
| | | | 719/329 |
| 11,755,393 | B2 | 9/2023 | Caldato et al. |
| 11,798,001 | B2 | 10/2023 | Jiang et al. |
| 2019/0108067 | A1 * | 4/2019 | Ishikawa ................ H04L 41/50 |
| 2020/0226002 | A1 * | 7/2020 | MacLeod ................... G06F 8/71 |
| 2021/0036925 | A1 * | 2/2021 | Boddam ............. H04L 41/0286 |
| 2021/0042160 | A1 | 2/2021 | Alamouti et al. |
| 2021/0329100 | A1 | 10/2021 | Knight et al. |
| 2022/0193915 | A1 | 6/2022 | Marinkovich et al. |
| 2023/0043702 | A1 | 2/2023 | Sells et al. |
| 2023/0077995 | A1 | 3/2023 | McGrath et al. |
| 2023/0173395 | A1 | 6/2023 | Cella et al. |
| 2023/0214925 | A1 | 7/2023 | Cella et al. |

FOREIGN PATENT DOCUMENTS

| | | |
|---|---|---|
| WO | 2020/092426 A2 | 5/2020 |
| WO | 2023/287969 A1 | 1/2023 |
| WO | 2023/030513 A1 | 3/2023 |
| WO | 2023/114985 A2 | 6/2023 |

OTHER PUBLICATIONS

Newman, Sam; Building Microservices; O'Reilly Media, Inc.; Feb. 2015; https://www.oreilly.com/library/view/building-microservices/9781491950340/.

* cited by examiner

SYSTEM AND METHOD FOR TRANSITIONING COMPUTING OPERATIONS

TECHNICAL FIELD

The following relates generally to transitioning computer integration systems.

BACKGROUND

Organizations at times transition their computing infrastructure from a first implementation to a new implementation. For example, an organization can transition from using a first remote computing service provider to another service provider.

Transitions are highly technical and context specific. Transitions can include a risk of previously functional components or processes being replaced with less reliable or less timely processes. The transition can be expensive, require large investments of time and expertise to perform, introduce undesirable delay (e.g., they can require downtime), etc. A transition can include burdensome testing of the new implementation, and/or can require having sufficient expertise of both the new and old implementations to correctly implement the functionality being replaced with the new implementation. A desirable transition also ensures no adverse impacts to infrastructure not directly related to the transition, etc.

Transitions are also technically complicated in that they can be implemented to facilitate interoperability between other services and require backwards compatibility. These factors require a high concentration of expertise to implement, (e.g., technical professionals from different domains can be required to anticipate the full ramifications of a transition). Coordination between the expertise is difficult and time consuming.

Scale and increased complexity amplify challenges associated with transitioning. For example, transitioning a service with one consumer application is relatively simple. Transitioning an integration service (e.g., a widely relied upon API) that connects with one hundred (100) consumer applications is unmanageable. All one hundred applications may need to be tested to ensure compatibility and interoperability. Each consumer application may need to have their specific considerations reviewed and tested for compatibility. The transition may be required to be implemented without fault for some of the consumer applications (e.g., in a banking context). The transition can be required to have sufficient capacity (e.g., if a real time consumer application relied on transitioned architecture), fault tolerance or redundancy built in, etc., to handle the anticipated volumes. In practice, with a plurality of consumer applications, the amount of regression testing needed to implement changes to large systems is potentially unmanageable.

BRIEF DESCRIPTION OF THE DRAWINGS

Embodiments will now be described with reference to the appended drawings wherein.

DETAILED DESCRIPTION

Figure 1:
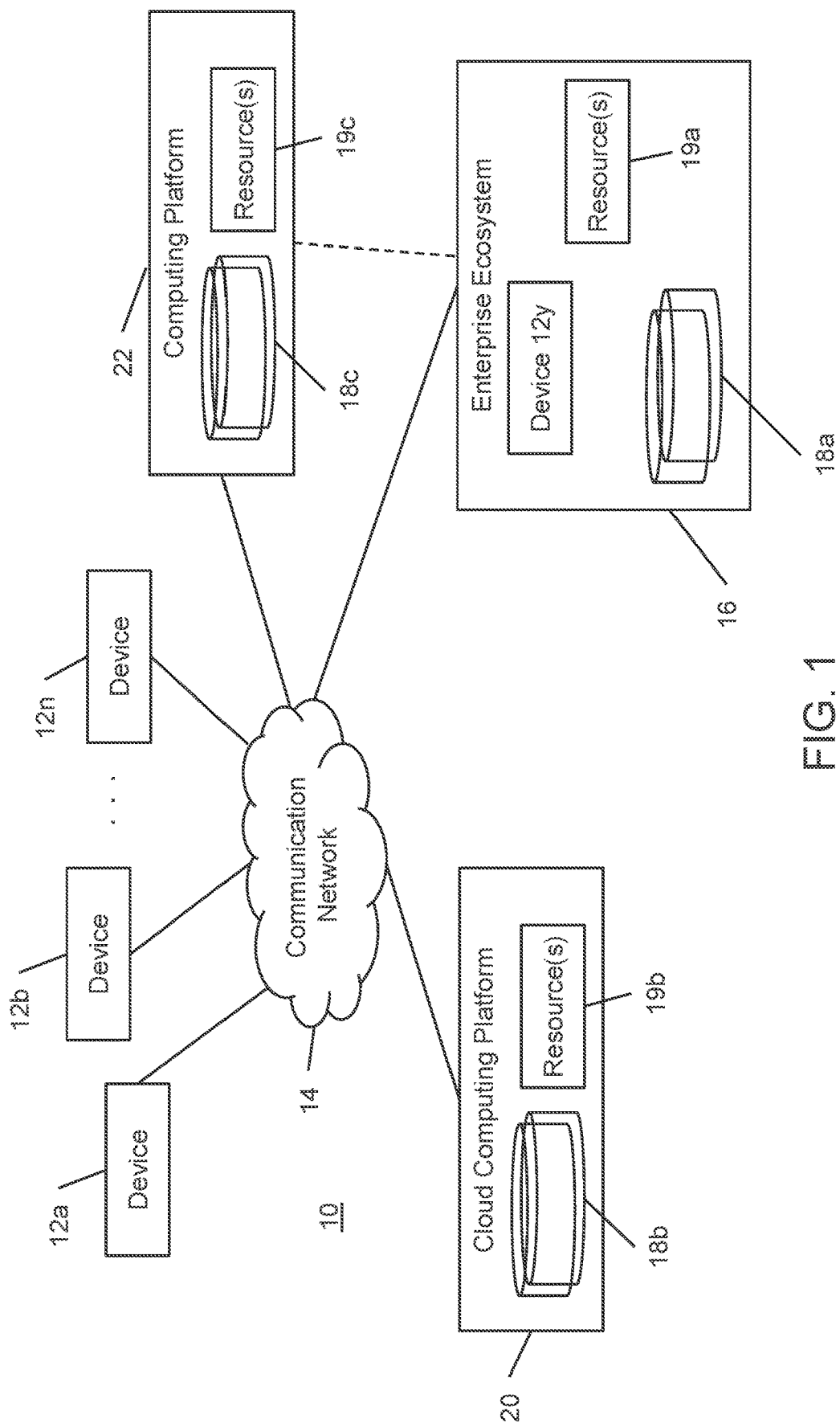
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The disclosure focuses on transitioning an existing interface into a target integration scheme. The existing interface can be too complex to replace completely. For example, the interface can handle large volumes of potentially sensitive interactions, such as for banking, and all the complexity associated with a modern banking operation (e.g., functionality of lending, personal banking, business services, applications for different jurisdictions based on compliance standards, different schemes being implemented in different business units, etc.). The complexity can be magnified as the interface can be laden with legacy architecture. For example, the interface can be hosted on legacy mainframe computing platforms, which increases the difficulty in transitioning the interface at least in part owing to lack of expertise and/or limited interoperability.

Approaches disclosed herein may include an incremental transition of an existing interface. The existing interface functionalities are mapped onto a target integration scheme (e.g., a domain driven design framework), and individual functionalities of the interface can be decomposed into services that the interface invokes in place of the transitioned functionality. The decomposition can be ordered such that relatively small functionalities are transitioned sooner, so that expertise on transitioning is developed over time before large and complex functionalities need to be transitioned.

The use of the incremental transition approaches described above can (1) enable transition from an existing interface, as work (and risk) are decomposed into smaller sizes, (2) reduce the amount of coordination required to implement the transition, as not all experts need to be involved at all points of the transition, (3) reduce downtime risk as incremental transition is performed, (4) increase expertise in transitioning, as the transition process can occur over a period of time and not all at once, allowing expertise to develop, (5) enable transitioning functionalities to less expensive computing platforms, reducing costs, (6) ensure backwards compatibility in a manageable fashion, through iterative configuration of the transitioned services, and/or (7) manage testing required to transition.

In one aspect, a system for transitioning a computer integration system is disclosed. The system includes a processor, and a memory coupled to the processor. The memory stores computer executable instructions that when executed by the processor cause the processor to provide an integration layer having an interface positioned between a plurality of consumer applications and a plurality of back-end services. The interface performs a plurality of functionalities. The instructions cause the processor to provide a target integration scheme to decompose the interface, the target integration scheme comprising a plurality of groupings. The instructions cause the processor to for at least one grouping of the plurality of groupings, provide a service that implements a subset of the plurality of functionalities. The instructions cause the processor to update the interface to handle requests for the subset via activating the service.

In example embodiments, the target integration scheme is a domain driven design, and the plurality of groupings are different domains.

In example embodiments, the service is configured to accept requests directly from at least one of the plurality of consumer applications.

In example embodiments, the instructions cause the system to iteratively provide services that implement different subsets of the plurality of functionalities for different groupings of the plurality of groupings, and remove the interface in response to the services being configured to accept requests directly from the plurality of consumer applications.

In example embodiments, the interface is implemented by a first computing platform, and the service is implemented by a second computing platform.

In example embodiments, to update the interface, the instructions cause the processor to remove code associated with the subset of the plurality of functionalities from the interface.

In example embodiments, the instructions cause the processor to iteratively provide services that implement different subsets of the plurality of functionalities for different groupings of the plurality of groupings. The services can be provided in an order based on a smallest size of the respective subset.

In example embodiments, the instructions cause the processor to update the service without impacting the interface.

In example embodiments, the plurality of functionalities comprises receiving application programming interface (API) calls from the plurality of consumer applications.

In another aspect, a method for transitioning a computer integration system is disclosed. The method includes providing an integration layer having an interface positioned between a plurality of consumer applications and a plurality of back-end services. The interface is for performing a plurality of functionalities. The method includes providing a target integration scheme to decompose the interface, the target integration scheme comprising a plurality of groupings. For at least one grouping of the plurality of groupings, the method includes providing a service that implements a subset of the plurality of functionalities. The method includes updating the interface to handle requests for the subset via activating the service.

In example embodiments, the method includes iteratively providing services that implement different subsets of the plurality of functionalities for different groupings of the plurality of groupings. The services can be provided in an order based on a smallest size of the respective subset.

In example embodiments, the interface is implemented by a first computing platform, and the service is implemented by a second computing platform.

In example embodiments, to update the interface, the method includes removing code associated with the subset of the plurality of functionalities from the interface.

In example embodiments, the method includes configuring the service to accept requests directly from at least one of the plurality of consumer applications.

In example embodiments, the plurality of functionalities comprises receiving application programming interface (API) calls from the plurality of consumer applications.

In example embodiments, the method includes removing code associated with the subset of the plurality of functionalities from the interface.

In example embodiments, the method includes updating the service without impacting the interface.

In another aspect, a non-transitory computer readable medium (CRM) for transitioning a computer integration system is disclosed. The CRM includes computer executable instructions for performing the above-described method(s).

FIG. 1 illustrates an exemplary computing environment 10. The computing environment 10 can include one or more devices 12 for interacting with other components within the environment 10, a communications network 14 connecting one or more components of the computing environment 10, an enterprise ecosystem 16, a computing platform 20 (e.g., a cloud computing platform, such as Amazon's AWS™), and a second computing platform 22 different from the first computing platform (e.g., a cheaper or more secure platform).

The enterprise ecosystem 16 stores, has access to, or at least is responsible for (e.g., stores on behalf of another) data from one or more data source(s). In the shown embodiment, the one or more databases 18a, a type of data source that is contemplated by this disclosure, are shown as a plurality of databases hosted by the enterprise ecosystem 16. It is understood that the term one or more data sources can include instances of data from different databases, or other sources, being stored within a single source (e.g., information provided by different devices 12 can be stored in the same database), or a combination of different data sources and different databases. Data in the database(s) 18a can be provided to the computing platform 20.

The enterprise ecosystem 16 can provide one or more services (e.g., via the example applications 24 of FIG. 2A), or simultaneously provide a plurality of services with the data from the one or more data sources. For example, the enterprise ecosystem 16 can be a platform of a financial institution such as commercial bank and/or lender, providing various services such as commercial and personal banking, lending, etc. The one or more services can be provided by one or more devices 12y of the ecosystem 16, and/or one or more computing resources 19a (e.g., a mainframe) of the ecosystem 16, etc. For example, the enterprise ecosystem 16 can provide a plurality of services via a plurality of enterprise resources (e.g., various instances of the shown databases 18a, and/or computing resources 19a). While several details of the enterprise ecosystem 16 have been omitted for clarity of illustration, reference will be made to FIG. 5 below for additional details.

As alluded to above, the enterprise ecosystem 16 includes, or has access to, resources 19*a* to provide services to customers, to facilitate business operations, to facilitate transferring data from the databases 18*a* to the cloud platform 20, etc.

The enterprise ecosystem 16 can rely on at least one of the computing platform 20 or the other computing platform 22 to provide the one or more services. Reliance can indicate that the ecosystem 16 interacts with the platform 20, 22, or the ecosystem 16 is at least in part integrated with the platforms 20, 22. For example, the enterprise ecosystem 16 can include a communications module (e.g., module 122 of FIG.) to facilitate communication with the computing platform 20 that can store one or more microservices, data related to the services, etc. The enterprise ecosystem 16 can have integrated therein a specialized computing platform 22 (e.g., a mainframe computing system provided by IBM™), with the platform 22 being responsible for certain interfaces, or hosting certain data, or performing services, etc. Various configurations are contemplated, with different configurations having a greater or lesser degree of involvement by the platforms 20, 22, and/or the platforms 20, 22 having different levels of integration with the ecosystem 16, etc.

Services provided by the ecosystem 16 can be provided to consumer applications (e.g., applications 24 shown in FIG. 2), so called for their consumption of services, and not to denote a type of user, and interaction between the consumer applications and the ecosystem 16 can include ecosystem 16 computing resources (e.g., resources 19*a*, databases 18*a*, or more generally devices 12*y*) being utilized to fulfill the services. The resources the ecosystem 16 uses to complete the consumer application requests can be referred to as "back-end" services, and can include, for example, database management, authentication, storage, notification, hosting, etc.

The computing platform 20, similar to the enterprise ecosystem 16, can include one or more instances of a data source, such as the shown database(s) 18*b*. These data sources can, for example, be for receiving and storing data, for storing services and functionalities, etc. The data source(s) of the computing platform 20 can be similar to the one or more data sources of the enterprise ecosystem 16 or can be separately configured. Resources 19*b* of the computing platform 20 can facilitate the creation of and storage of data, the creation and application of one or more tools (e.g., transformation or modelling tools), perform operations on stored or ingested data, updating tools or data, etc.

The computing platform 22, similar to the enterprise ecosystem 16, can include one or more instances of a data source, such as the shown database(s) 18*c*. These data sources can, for example, be for receiving and storing data, for storing services and functionalities, etc. The data source(s) of the computing platform 22 can be similar to the one or more data sources of the enterprise ecosystem 16 or can be separately configured. Resources 19*c* of the computing platform 20 can facilitate the creation of and storage of data, the creation and application of one or more tools (e.g., transformation or modelling tools), perform operations on stored or ingested data, updating tools or data, etc.

Hereinafter, for ease of reference, the term plurality of data sources will be used to reference various combinations of the data sources. For example, the term plurality of data sources can include a single database 18*c* storing data from multiple data sources (e.g., devices 12), or a combination at least in part of a database(s) 18*a* and/or a database(s) 18*b* and/or device 12, etc. Hereinafter, for ease of reference, the resources 18, 19, of the ecosystem 16 or the platforms 20, 22 shall be referred to as computing resources, unless otherwise indicated.

Devices 12 may be associated with one or more users. Users can include customers, employees, clients, investors, depositors, correspondents, or other entities that interact with the enterprise ecosystem 16 and/or computing platform 20 and/or computing platform 22 (directly or indirectly). The computing environment 10 may include multiple devices 12, each device 12 being associated with a separate user or being associated with one or more users. The devices can be external to the enterprise ecosystem (e.g., the shown devices 12*a*, 12*b*, to 12*n*, which can provide data to populate the plurality of data sources, etc.), or internal to the enterprise ecosystem 16 (e.g., the shown device 12*y*, which can be controlled by a database manager of the enterprise, etc.). In certain embodiments, a user may operate a device 12 such that the device 12 performs one or more processes consistent with the disclosed embodiments. For example, the user may use a device 12 to request that decomposition of an integration layer component be initiated, update a certain service, update an interface, etc.

Devices 12 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect several types of devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The computing platform 20, and/or computing platform 22, and/or enterprise ecosystem 16 may also include a cryptographic module (e.g., cryptographic module 163 of FIG. 5) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the computing platform 20, and/or the computing platform 22, and/or enterprise ecosystem 16. The cryptographic server may, for example, be used to protect any data of the enterprise ecosystem 16, such as when in transit to the computing platform 20, or within the computing platform 22 (e.g., data such as financial data and/or client data) by way of encryption for data protection, digital signatures or message digests for data integrity, and/or by using digital certificates to authenticate the identity of the users and devices 12 with which the enterprise ecosystem 16 and/or computing platform 20 communicates with (e.g., requests). It can be appreciated that various cryptographic mechanisms and protocols can be chosen and implemented to suit the constraints and requirements of the particular deployment of the computing platform 20 or enterprise ecosystem 16 as is known in the art.

Referring now to FIGS. 2A, 2B, 2C, and 2D, a series of block diagrams is presented that show an example transition of an interface into a target integration scheme. It is understood that the example transition is just that, an example, and that other transitions are contemplated.

FIG. 2 show a plurality of consumer applications as applications 24a, 24b . . . 24n. The consumer applications 24 can interact with the ecosystem 16 to request, facilitate, or perform one or more services. For example, the application 24a can be a customer mobile application for personal banking, and the service provided by the ecosystem 16 can include authentication, providing a balance on accounts, performing a transaction, providing information to further a credit application, etc. The shown consumer applications 24 are an external source of requests for the services of the ecosystem 16, but it is understood that the consumer applications 24 can also be within the ecosystem 16 (e.g., an employee application).

Figure 2A:
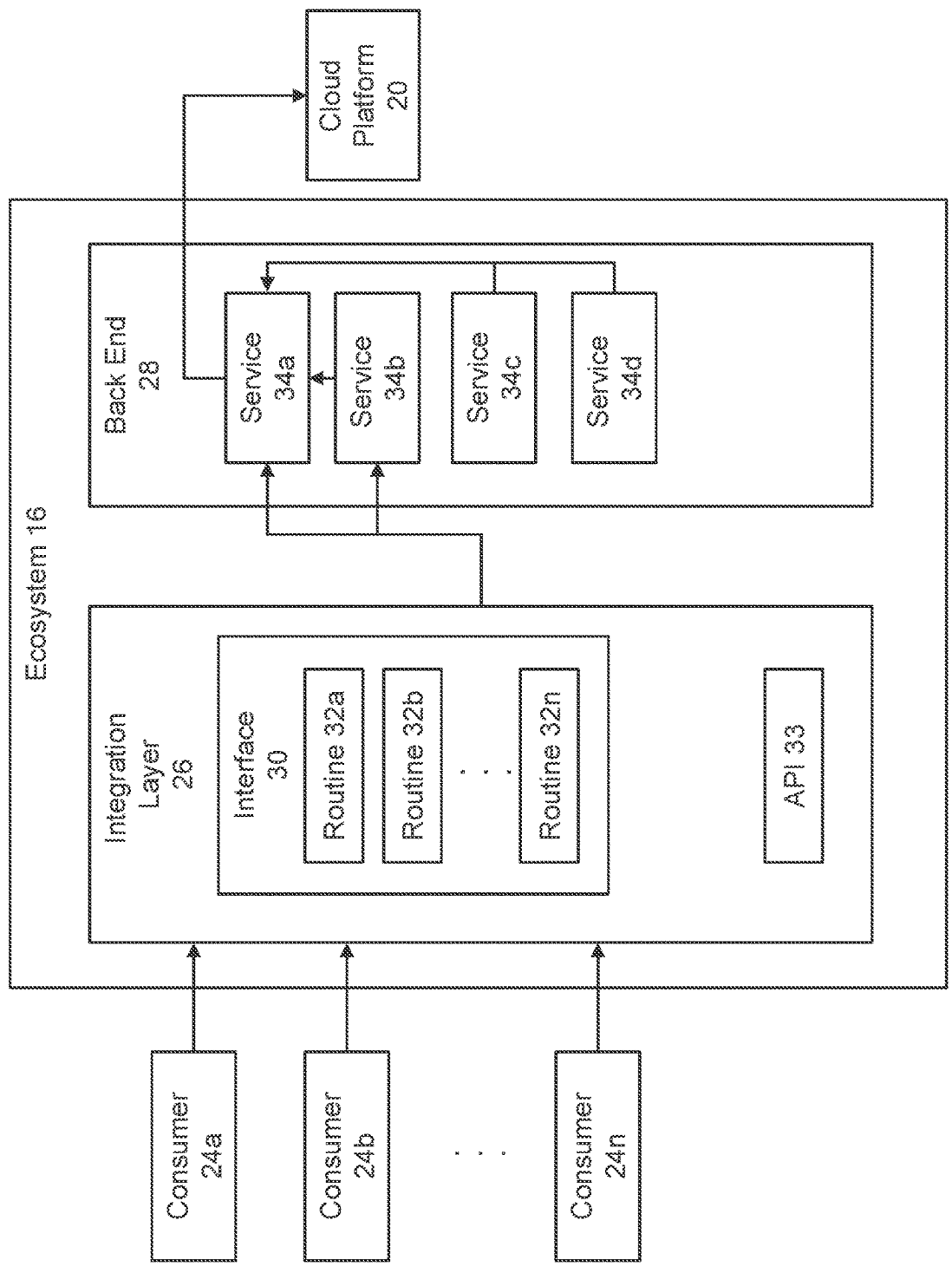
FIG. 2A shows a block diagram of an example existing workflow.

In FIG. 2A, an existing implementation of a workflow by an ecosystem 16 is shown. Services are provided by having consumer applications 24 interact with an interface layer 26 that is positioned between consumer applications 24 and the back-end services 28.

The integration layer 26 includes an interface 30 (e.g., an application programming interface (API)) that is invoked by the applications 24 to complete the services. The interface 30 can be a legacy interface, that, over time, had a plurality of functionalities added via various routines, such as the shown routines 32a, 32b . . . 32n. For example, the interface 30 can be an interface implemented on a legacy computing platform 20 via a mainframe that, as a result of the sensitive nature of the services provided (e.g., banking transactions) via the interface 30, has not been transitioned. Instead, over a period of time, the software code implementing the interface 30 can progressively grow more complex with more or updated routines 32, until it poses challenges not just for transitioning, but also for enhancement of existing services and for maintenance (e.g., including maintenance of the interface 30, or of existing services). The interface 30 can also have grown by having functionality moved and built into its code (e.g., upon decommissioning another integration approach, such as a legacy web-service approach), rendering the interface 30 itself more complex, and rendering the process of navigating and potentially updating the individual functionalities within the interface 30 more complex.

The routines 32 can include a variety of different functionalities. For example, the routines 32 can include receiving application programming interface (API) calls from the plurality of consumer applications 24 and directing them to different back-end 28 services 34. The routines 32 can include applying algorithms, doing calculations, etc.

The interface 30 can also, for the sake of convenience, have been used to integrate non-enterprise data. The reliance on the interface 30 to integrate the non-party with a computing resource 18a, or 19a of the ecosystem 16, can contribute to a more complex and cross-boundary domain in the ecosystem 16.

In one example embodiment, the interface 30 can be a key party asset within a financial institution ecosystem. This interface 30 can be a monolithic API. Its size can have resulted from migration of certain services, whose computing architecture was decommissioned, into the interface 30, resulting in its transformation to a complex API with many endpoints.

The complexity can contribute to challenges such as a lack of backward compatibility, and orchestration complexities. This can lead to unpredictable outcomes in integration steps. The interface's 30 deficiency in orchestration poses significant hurdles, particularly in integrations involving multiple steps, impacting the predictability of outcomes, such as in creating or updating profiles. The monolithic nature of the interface 30 can also create redundancies and inefficiencies, as it is difficult to appreciate the full scope of the interface 30.

The interface 30 can be expensive to implement. For example, the interface 30 can be provided by the computing platform 20 and can charge for various operations, for storing data, etc., and these expenses can be greater compared to more modern cloud computing systems.

The integration layer 26 can include other interfaces, such as the shown API 33. The interface 30 can undesirably duplicate some of the API 33.

The interface 30 can direct requests, or otherwise make use of one or more back-end 28 services (e.g., the shown services 34a, 34b, 34c, and 34d) to complete the requested service. The interface 30 can make use of multiple services 34 itself, or trigger a chain of interrelated services 34, as shown by the various interconnections in FIG. 2A. The services 34 can be used to update a cloud platform, such as platform 20, which may store production data.

A transition from the implementation shown in FIG. 2A is desirable. Unlike approaches that require a complete replacement of the legacy interface 30, which as discussed above can be virtually impossible, which circumstances led to the interface 30 becoming as complex as it is, the approach disclosed herein can include an iteratively implemented transition to a target integration scheme.

Figure 3:
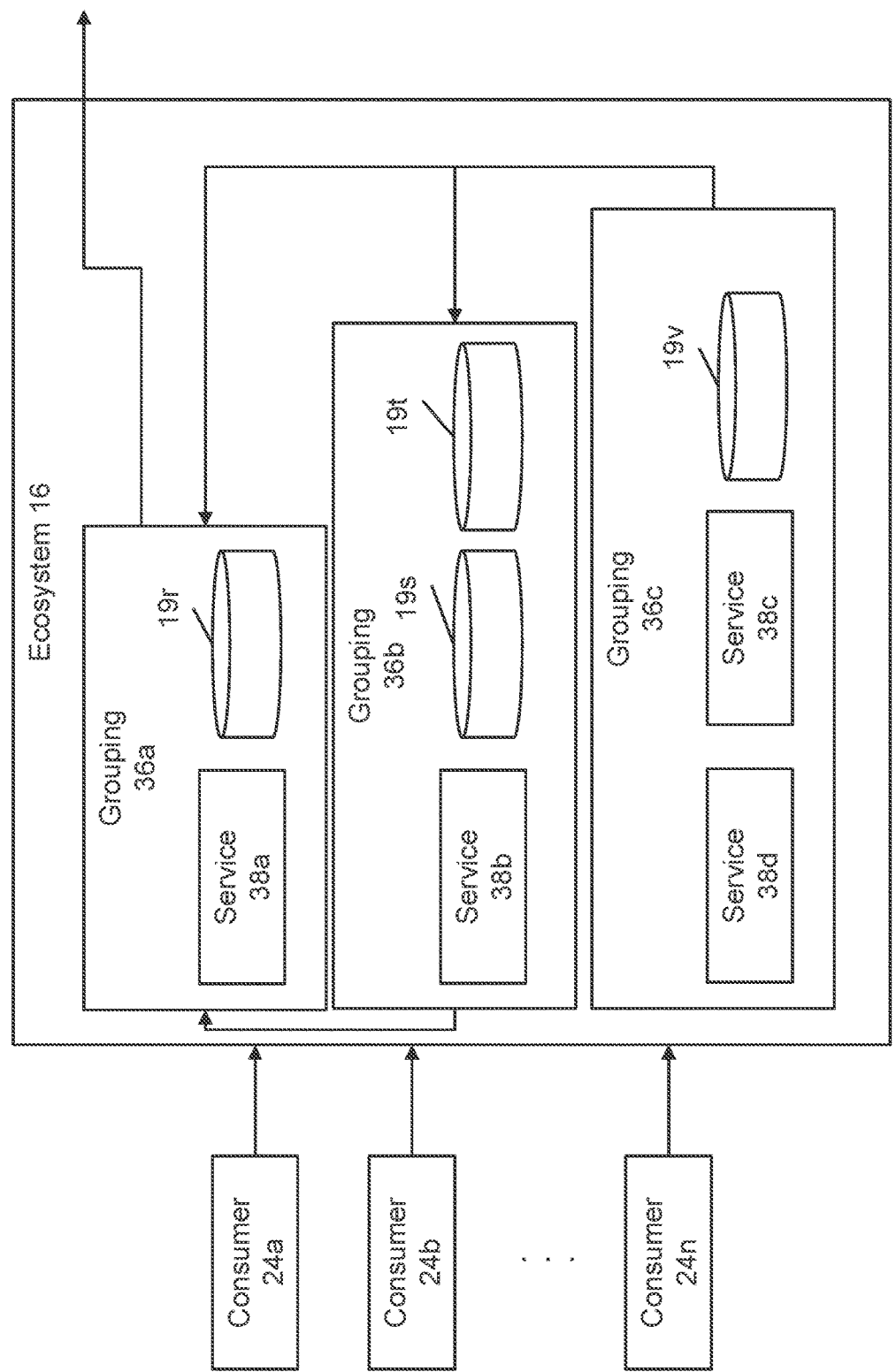
FIG. 3 shows a block diagram of an example target integration scheme.

Referring now to FIG. 3, a target integration scheme is shown. In FIG. 3, the target integration scheme is a domain-driven design scheme, with computing infrastructure categorized into the shown plurality of groupings 36.

The plurality of groupings 36 can be provided with various approaches. For example, the plurality of groupings can be automatically generated by applying modelling to determine a relation between consumer applications 24 and the back end 28. In another example, event storming sessions are used to map the flow of information and events within the ecosystem 16 to define the groupings 36. The groupings 36 can be bounded contexts of various services that are well-defined and coherent. The groupings 36 can define data ownership within each bounded context, such as events or APIs for data sharing. When the plurality of groupings 36 are generated, a level of consistency required between various bounded contexts can be defined and used to inform the grouping definitions.

As alluded to above, each of the plurality of groupings 36 can include one or more services 38, with the single instance services 38a, 38b shown in groupings 36a, 36b, and the multiple services 38c, 38d shown in grouping 36c. The services 38 can perform a plurality of functions and can alternatively each be referred to as microservices. For example, the grouping 36a can be a business domain, and the service 38a can be a service to update an address of a customer profile. Microservices are desirable for their ease of maintenance and robustness, in addition to reducing complexity within the microservice.

Each service 38 can be segregated to operating within the respective grouping 36. That is, the service 38 can be configured to respond to only events that are subscribed to by, or relevant to the respective grouping 36. Services 38 can be used to trigger a chain of services 38 in different groupings 36. For example, an address update service 38a of the business grouping 36a can, to update an address in the database(s) 19r, invoke an authentication service 38b of the general grouping 36b to ensure that user is authenticated prior to updating the address information. Various interconnectedness between groupings 36 via services, with services or applications external to the ecosystem 16, etc., is contemplated, and are demonstrated by the example connections shown between groupings 36 in FIG. 3.

The groupings 36 can further have access to, or be assigned, one or more database(s). In the shown embodiment, the databases are represented as databases 19r, 19s, 19t, 19v within the ecosystem 16. These data bases can be pre-loaded on the ecosystem 16 (as compared to on a computing platform 20, 22) to facilitate less expensive or less time sensitive processing. It is understood that various are configurations are contemplated, with different database(s), or one, or more than one database being hosted one or more of the ecosystem 16 and/or the platform 20, and/or the platform 22.

Figure 2B:
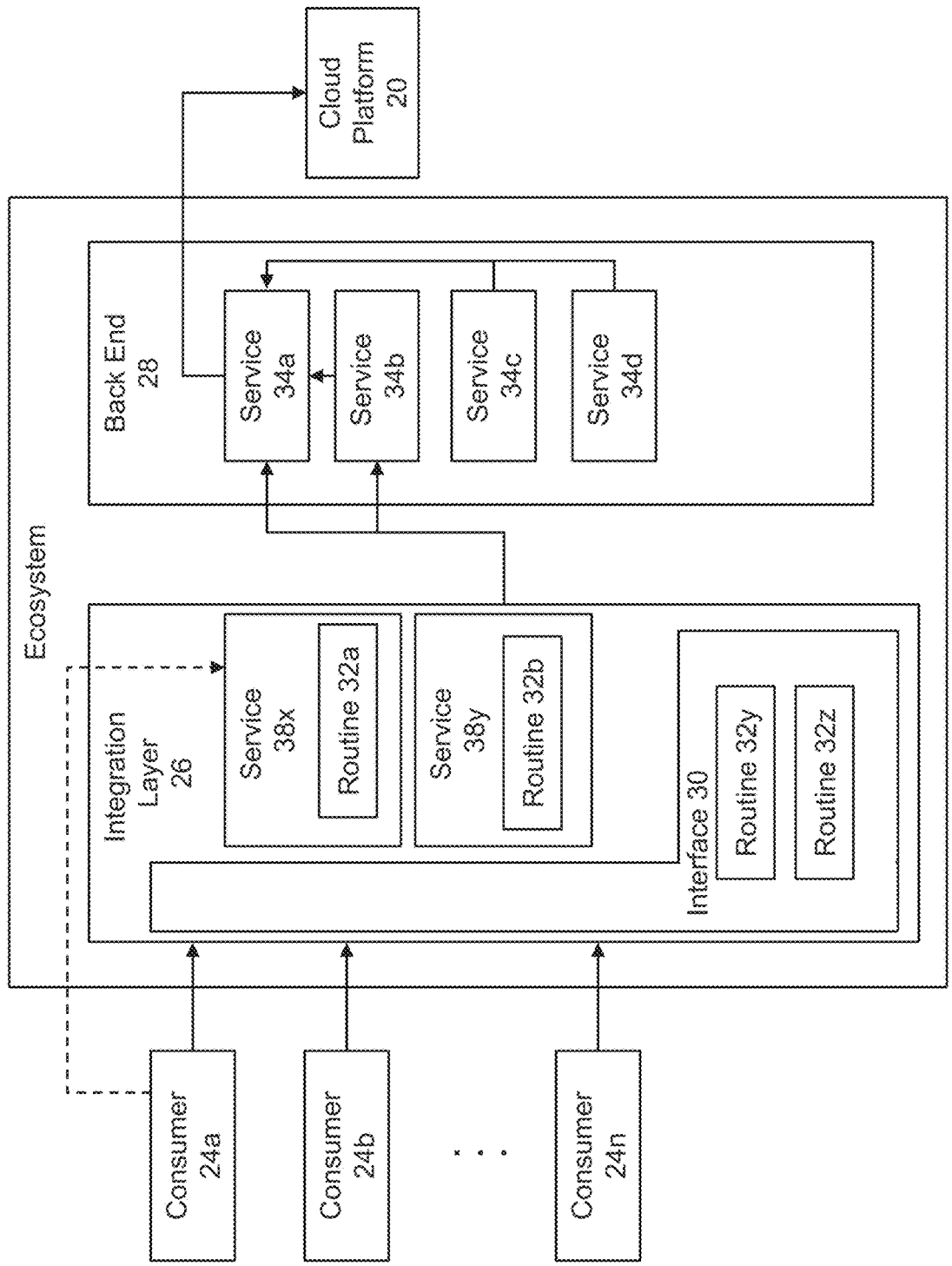
FIG. 2B shows a block diagram of an example stage of an example transition of an interface into a target integration scheme.

Referring now to FIG. 2B, an example first stage of a transition from the existing interface 30 to a target integration scheme (e.g., the scheme shown in FIG. 3) is shown.

In FIG. 2B, the interface layer 30 has been in part decomposed, with routines 32a, 32b being now provided by the services 38x, 38y, respectively. For clarity, although routines 32a, 32b are shown in both FIG. 2A and FIG. 2B, it is understood that routines 32a, 32b in FIG. 2B are used to indicate the same functionality being performed, and that they are not identical. For example, the routines 32a, 32b of FIG. 2B can be accomplished with domain events via the services 38x, 38y, which domain events are not used in FIG. 2A.

In FIG. 2B, the interface 30, when receiving requests that require the routines 32a, 32b, handles those requests by activating or calling the services 38x, 38y. The services 38 can then communicate directly with the back end 28 to complete the associated processes, without the interface 30. At the shown stage, the interface 30 maintains at least some routines 32y, 32z. By transitioning the functionality of one or more routines (e.g., routines 32a, 32b), while maintaining the functionality of the interface 30 otherwise (e.g., routines 32y, 32z), the disclosed approach enables a transition between the interface 30 and the target integration scheme in a manageable manner. Testing is required only for those routines being migrated. Redundancy, coordination efforts between different teams, and downtime is limited, as only transitioning services 38 need to be accounted for. The disclosed approach was the only viable approach for transitioning an existing interface 30 without unacceptable risk, coordination, and downtime.

The service 38 used to decompose the interface 30 can be hosted on a different computing platform (e.g., a transition from the platform 22, and the mainframe based technology, to the platform 20, which can be a cloud computing platform). The use of a different platform for the service 38 can enable tailoring the platform for the needs of the service 38.

For example, if the centrality of a mainframe based computing platform is not required for a service 38, that service 38 can be migrated to the less expensive cloud platform 20. With incremental decomposition, the risk associated with the transition is more manageable as well. In addition, if the service 38 replaces a routine 32 that handled non-party information via the centralized mainframe based computing platform 22, the use of the other computing platform 20 can remove the need to ingest that non-enterprise data into the mainframe.

To facilitate the removal of the interface altogether, the service 38 that is used to decompose the interface 30 can be configured to accept requests directly from at least one of the plurality of consumer applications 24. For example, whereas in FIG. 2A a request for a customer balance from a mobile consumer application 24 can flow through the interface 30, in FIG. 2B the mobile consumer application 24 can request the balance from the respective service 38 directly, bypassing the interface 30. Various adjustments (if any are required) can be made to the service 38 to facilitate direct communication with the applications 24. For example, the service 38 can be adjusted to route the request to an authentication service.

As time goes on, with the incremental decomposition of the interface 30, developers can gain expertise in the decomposition process and the different computing platforms used to implement the new services, if any. This expertise can impact the speed and efficiency at which subsequent services 38 are transitioned.

The services 38 can be updated without impacting the operations of the interface 30 given that the interface 30 acts as a gateway for those services. Therefore, the process of implementing the target integration scheme can be furthered without needing the complication of manipulating the interface, allowing the transition to have lasting power to respond to later developments.

The services 38 can be selected for implementation to decompose the interface 30 based on one or more criteria. For example, the services 38 can be selected in an order to reflect the downtime required. Services 38 that encompass routines 32 that have a large acceptable downtime can be transitioned first. The criteria can be based on the number of routines 32 that a service 38 incorporates. For example, the service 38 can be provided based on a smallest size of the respective subset of routines that it replaces. In this way, the expertise to transition the interface 30 develops over time, with the more complicated services 38 being provided only once the development team has experience developed from providing smaller services 38. The services 38 selected for transition can be based on a grouping 36. For example, the grouping 36 can represent a subunit of an enterprise that is implementing a transition itself, and the interface 30 transition can be prioritized to modernize the subunit. Combinations of criteria are also contemplated. For example, the development team can provide services 38 for a particular grouping 36, transitioning the smaller services 38 in that grouping 36 before larger services 38.

Figure 2C:
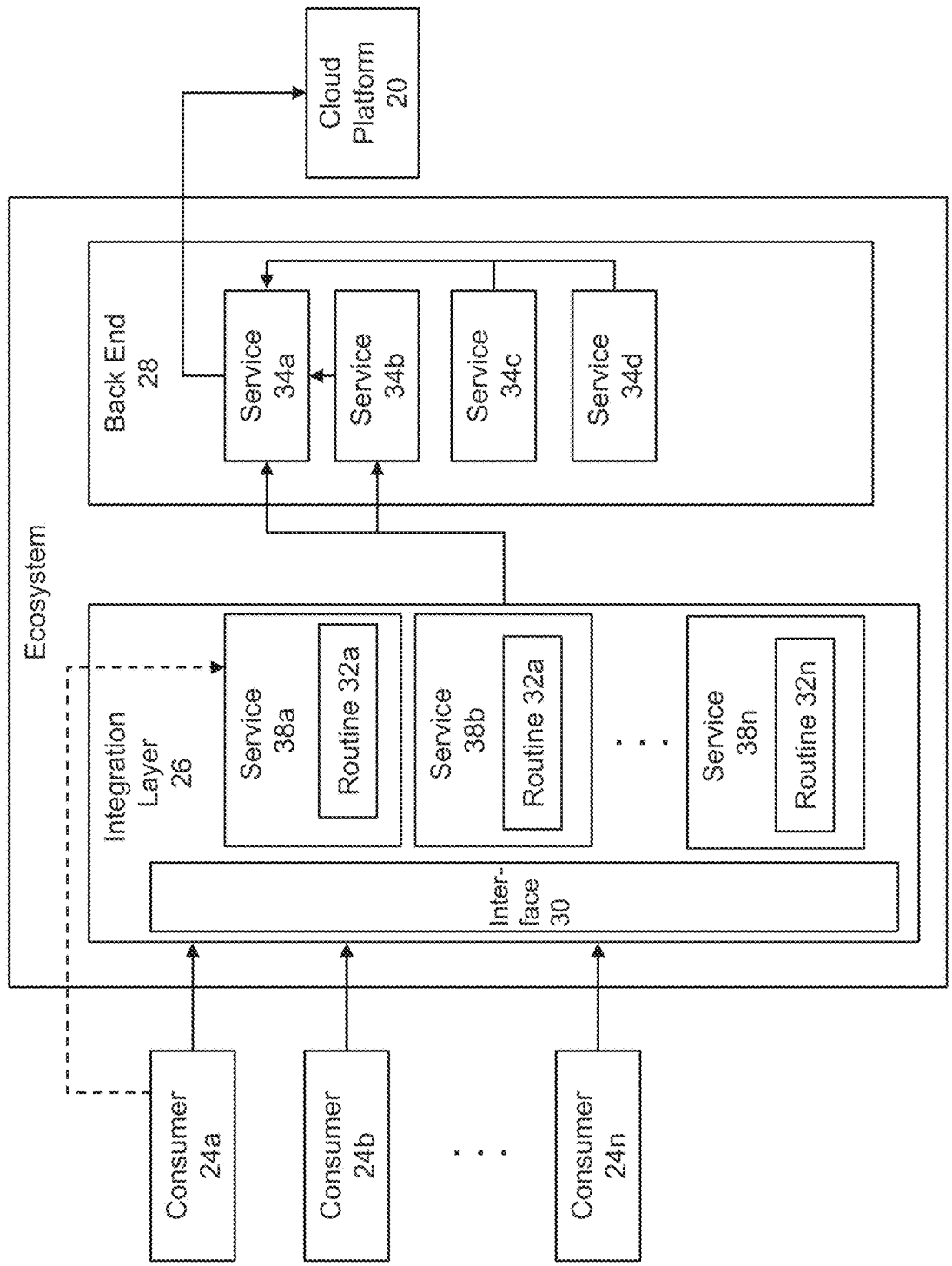
FIG. 2C shows a block diagram of an example further stage of an example transition of an interface into a target integration scheme.

FIG. 2C shows an example second stage of a transition from the existing interface 30 to a target integration scheme.

In FIG. 2C, the routines 32 can all have been decomposed into services 38, such that the interface 30 is transformed into a gateway that receives requests to redirect them to the applicable services 38. While the interface 30 is shown to imply that all services 38 are accessible via the interface 30, it is understood only some of the services 38 may be accessible via the interface 30. For example, a service 38 used by a constantly updated consumer application 24 can be configured to accept direct communications from that application 24, and that application can stop communicating with the interface 30 altogether to access the relevant routine 32.

This stage can be advantageous, particular in circumstances with a plurality of consumer applications 24, in maintaining the status quo while allowing the plurality of consumer applications 24 to transition to direct communications with the applicable services 38. For example, certain consumer applications 24 can be updated only rarely, and maintaining the interface 30 can persist the known functionality of the application 24, while generating the services 38 required to transition the ecosystem 16.

One or more of the services 38, the ecosystem 16 (e.g., via), can be configured to provide the applications 24 with a notification that the service 38 can be used in place of the interface 30. For example, the ecosystem 16 can include published documentation informing developers of the implemented service 38. The service 38 (or interface 30, as part of the decomposing) can be configured to review which consumer applications 24 access the service 38 through the interface 30, and publish that list to a notification module (not shown) that emails developers associated with the respective application 24, etc.

Figure 2D:
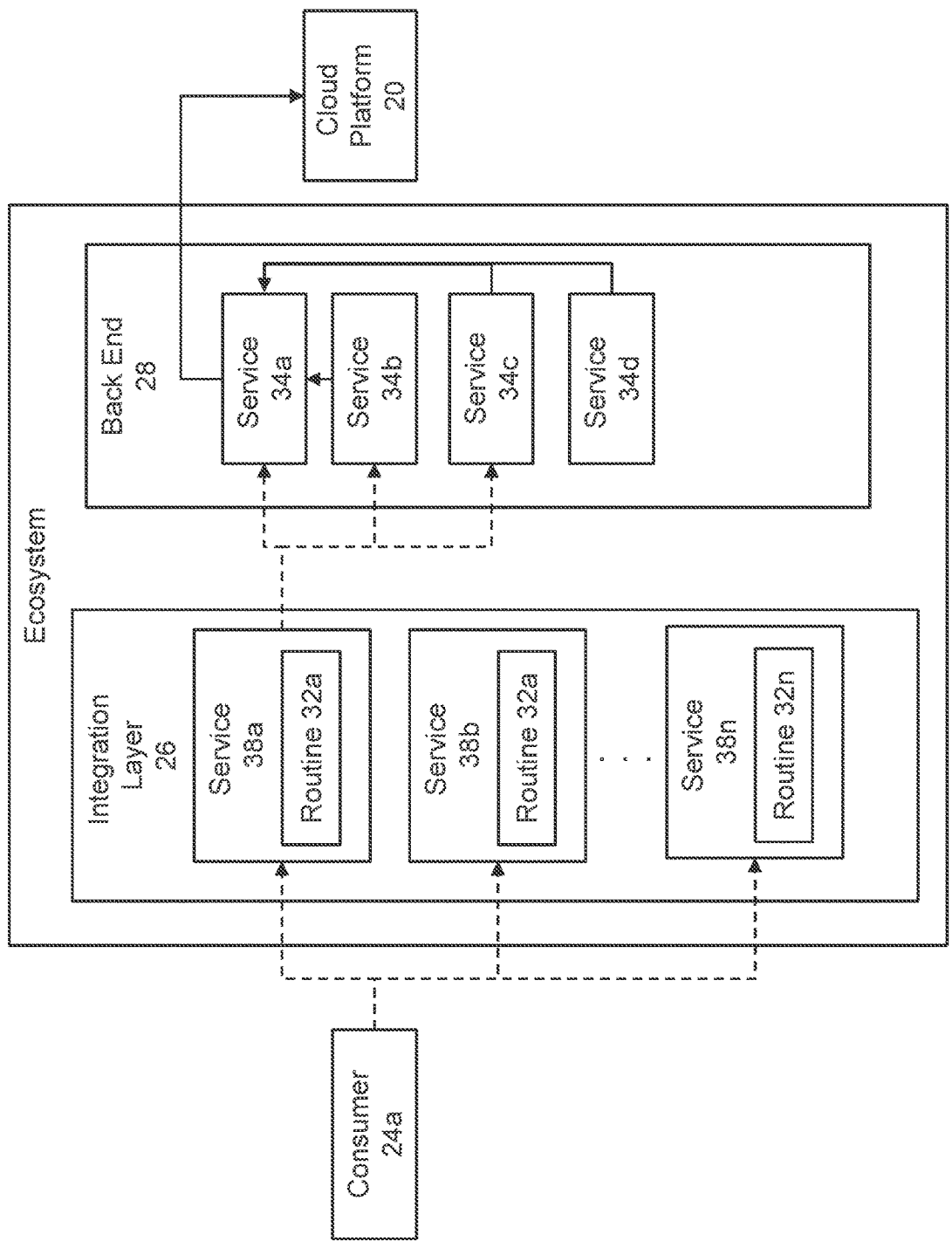
FIG. 2D shows a block diagram of yet another example stage of an example transition of an interface into a target integration scheme.

FIG. 2D shows an example final stage of a transition from the existing interface 30 to a target integration scheme. In FIG. 2D, for visual clarity, only a single consumer application 24 is shown.

The consumer application 24a can directly communicate with one or more services 38, without using the interface 30. The services 38 directly communicate with the back-end 28, without the interface 30. The interface 30 has been removed. Thus FIGS. 2B, 2C, 2D disclose a multi-stage decomposition of a complex interface 30, without impacting existing applications, and without removal of the interface 30.

Figure 4:
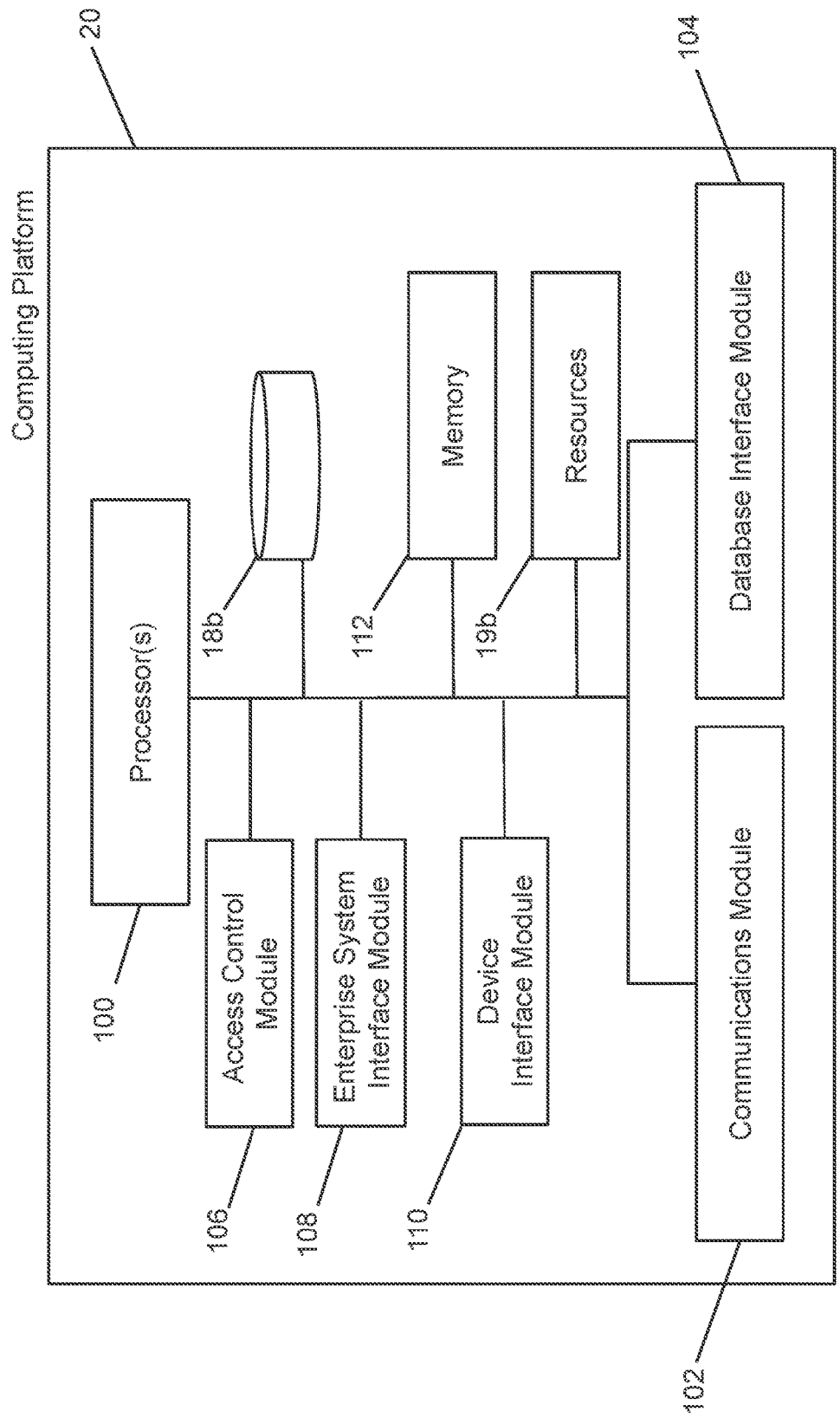
FIG. 4 shows a block diagram of an example configuration of a computing platform.

Referring now to FIG. 4, a block diagram of an example configuration of a computing platform 20, 22 is shown. FIG. 4 illustrates examples of modules, tools and engines stored in memory 112 on the computing platform 20, 22 and operated or executed by the processor(s) 100. It can be appreciated that any of the modules, tools, and engines shown in FIG. 4 may also be hosted externally and be available to another instance of the computing platform 20, 22, or on another computing platform, e.g., via the communications module 102.

In the example embodiment shown in FIG. 4, the computing platform 20, 22 includes an access control module 106, an enterprise system interface module 108, a device interface module 110, and a database interface module 104. The access control module 106 may be used to apply a hierarchy of permission levels or otherwise apply predetermined criteria to determine what aspects of the computing platform 20, 22 can be accessed by devices 12 and/or ecosystem 16, what resources 18, 19, the computing platform 20, 22 can provide access to, and/or how related data can be shared with which entity in the computing environment 10. For example, the computing platform 20, 22 may grant certain employees of the enterprise ecosystem 16 access to implement services 38, but not other employees. In another example, the access control module 106 can be used to control which users are permitted to introduce new services 38, to adjust the interface 30, or change access permissions to those components, etc. As such, the access control module 106 can be used to control the sharing of resources 18, 19 or aspects of the computing platform 20, 22 based on a type of client/user, a permission or preference, or any other restriction imposed by the enterprise ecosystem 16, the computing environment 10, or application 24 in which the computing platform 20 is used.

The enterprise system interface module 108 can provide a graphical user interface (GUI), software development kit (SDK) or application programming interface (API) connectivity to communicate with the enterprise ecosystem 16. It can be appreciated that the enterprise system interface module 108 may also provide a web browser-based interface (e.g., employees of the enterprise ecosystem 16 can access cloud resources via their personal devices 12), an application or "app" interface, a machine language interface, etc. Similarly, the device interface module 110 can provide a GUI, SDK or API connectivity to communicate with devices 12. The database interface module 104 can facilitate direct communication with database 18, or other instances of database 18 stored on other locations of the environment 10.

Figure 5:
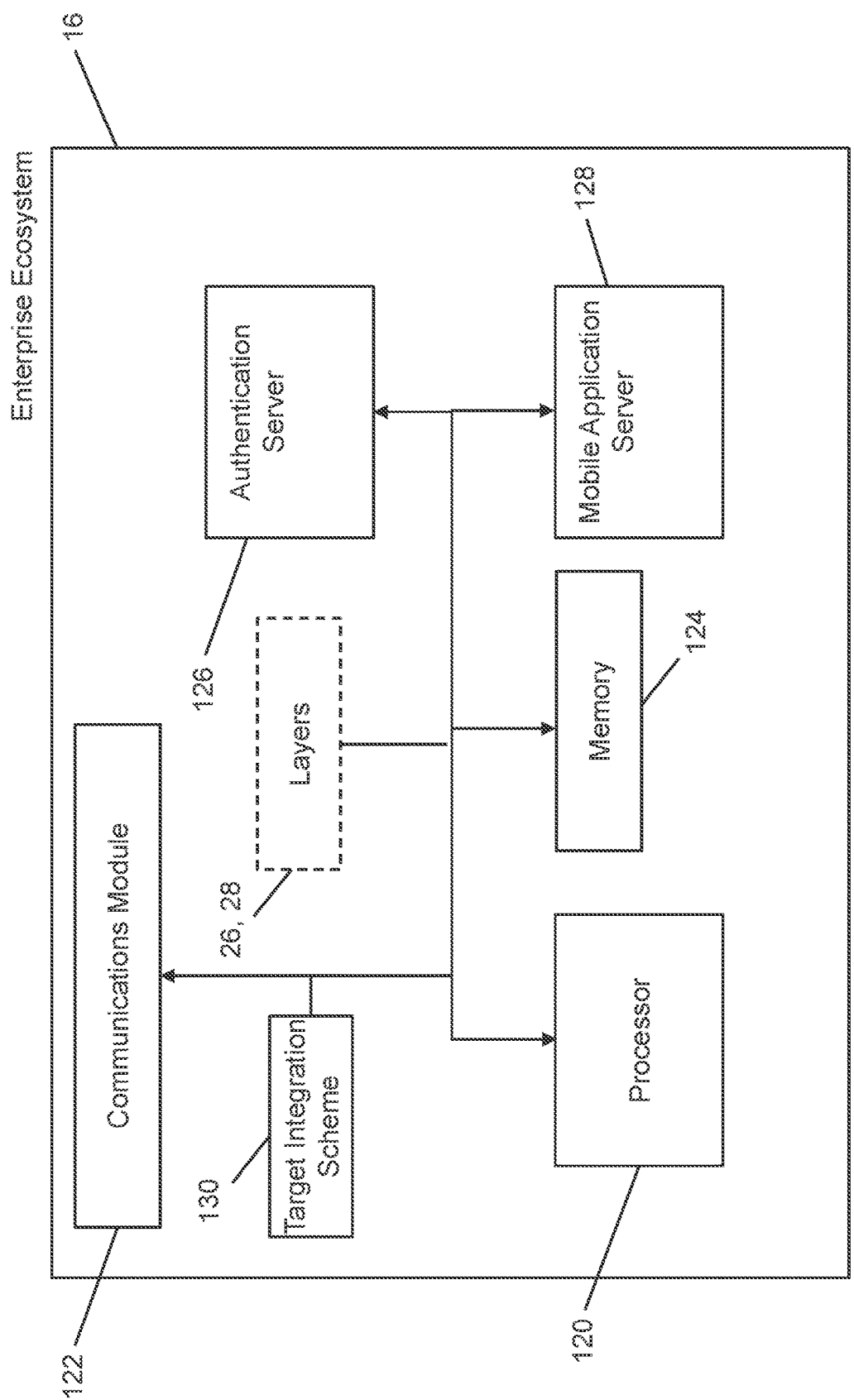
FIG. 5 shows a block diagram of an example configuration of an enterprise ecosystem.

In FIG. 5, an example configuration for an enterprise ecosystem 16 is shown. In certain embodiments, similar to the computing platform 20, 22, the enterprise ecosystem 16 may include one or more processors 120, a communications module 122, and a database interface module (not shown) for interfacing with the remote or local datastores to, e.g., retrieve, modify, and store (e.g., add) data to the resources 18a, 19a. Communications module 122 enables the enterprise ecosystem 16 to communicate with one or more other components of the computing environment 10, such as the computing platform 20, 22 (or one of its components), via a bus or other communication network, such as the communication network 14. The enterprise ecosystem 16 can include at least one memory or memory device 124 that can include a tangible and non-transitory computer-readable medium having stored therein computer programs, sets of instructions, code, or data to be executed by processor 120. FIG. 5 illustrates examples of modules, tools and engines stored in memory on the enterprise ecosystem 16 and operated or executed by the processor 120. It can be appreciated that any of the modules, tools, and engines shown in FIG. 5 may also be hosted externally and be available to the enterprise ecosystem 16, e.g., via the communications module 122. In the example embodiment shown in FIG. 5, the enterprise ecosystem 16 includes at least part of the integration layer 26 and/or the back-end 28 (e.g., to facilitate data management), an authentication server 126, for authenticating users to access resources 18a, 19a, of the enterprise, and a mobile application server 128 to facilitate a mobile application that can be deployed on mobile devices 12. The enterprise ecosystem 16 can include an access control module (not shown), similar to the computing platform 20. The enterprise ecosystem 16 can also include, or have access to, a documentation of definition of the target integration scheme 130.

Figure 6:
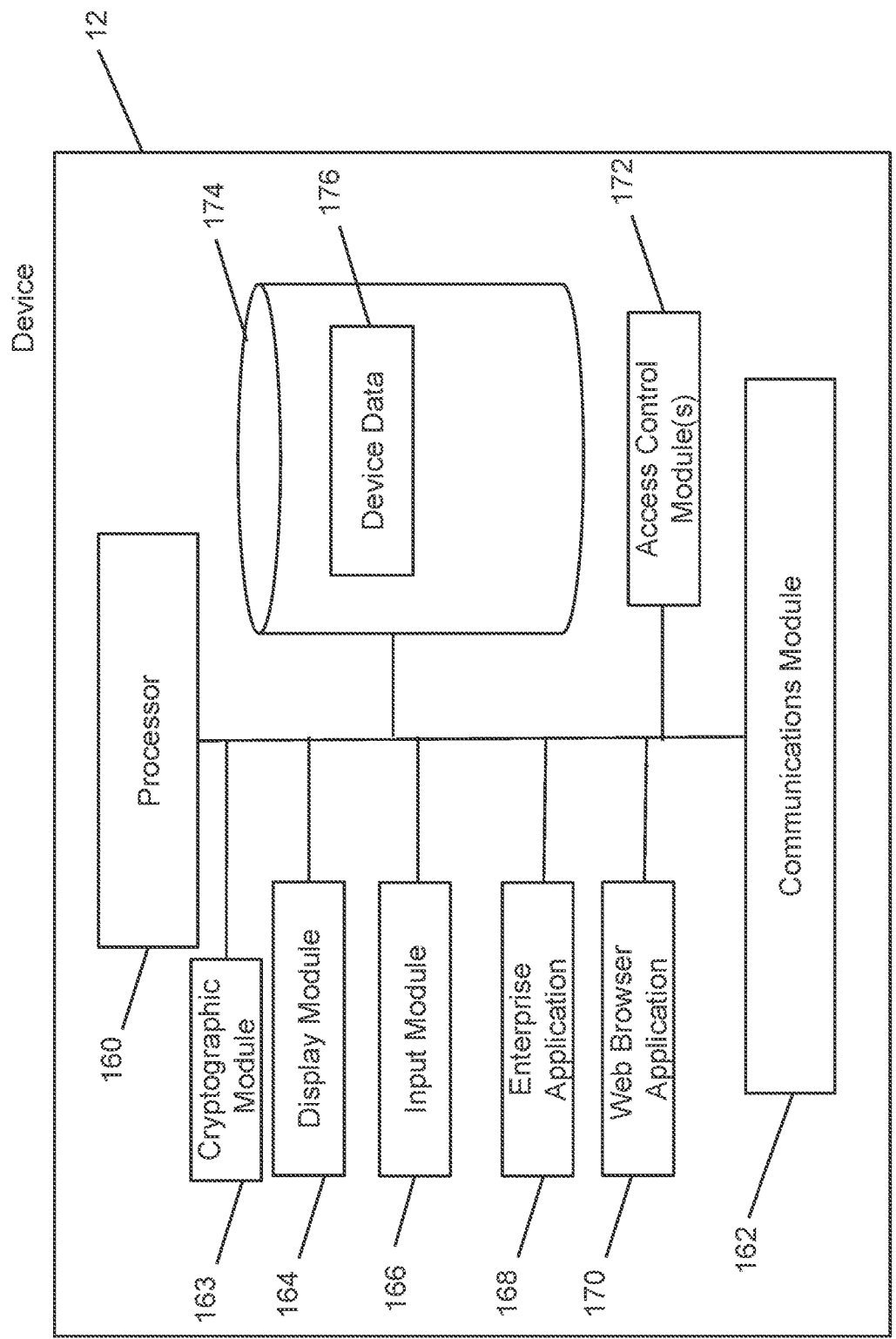
FIG. 6 shows a block diagram of an example configuration of a user device.

In FIG. 6, an example configuration of a device 12 is shown. In certain embodiments, the device 12 may include one or more processors 160, a communications module 162, a cryptographic module 163, and a data store 174 storing device data 176, an access control module 172 similar to the access control module of FIG. 4. Communications module 162 enables the device 12 to communicate with one or more other components of the computing environment 10, such as the computing platform 20, or enterprise ecosystem 16, via a bus or other communication network, such as the communication network 14. While not delineated in FIG. 6, similar to the computing platform 20, the device 12 includes at least one memory or memory device that can include a tangible and non-transitory computer-readable medium having stored therein computer programs, sets of instructions, code, or data to be executed by processor 160. FIG. 6 illustrates examples of modules and applications stored in memory on the device 12 and operated by the processor 160. It can be appreciated that any of the modules and applications shown in FIG. 6 may also be hosted externally and be available to the device 12, e.g., via the communications module 162.

In the example embodiment shown in FIG. 6, the device 12 includes a display module 164 for rendering GUIs and other visual outputs on a display device such as a display screen, and an input module 166 for processing user or other inputs received at the device 12, e.g., via a touchscreen, input button, transceiver, microphone, keyboard, etc. The device 12 may also include an enterprise application 168 provided by the enterprise ecosystem 16, e.g., for submitting requests to transfer data from the database 18*a* to the cloud. The device 12 in this example embodiment also includes a web browser application 170 (e.g., a consumer application 24) for accessing Internet-based content, e.g., via a mobile or traditional website and one or applications (not shown) offered by the enterprise ecosystem 16 or the computing platform 20. The data store 174 may be used to store device data 176, such as, but not limited to, an IP address or a MAC address that uniquely identifies device 12 within environment 10. The data store 176 may also be used to store authentication data, such as, but not limited to, login credentials, user preferences, cryptographic data (e.g., cryptographic keys), etc.

It will be appreciated that only certain modules, applications, tools, and engines are shown in FIGS. 4 to 6 for ease of illustration and various other components would be provided and utilized by the computing platform 20, 22, the enterprise ecosystem 16, and device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in computing platform 20 or enterprise ecosystem 16, or device 12, or accessible or connectable thereto. Any application or module herein described may be implemented using computer readable/executable instructions that may be stored or otherwise held by such computer readable media.

Figure 7:
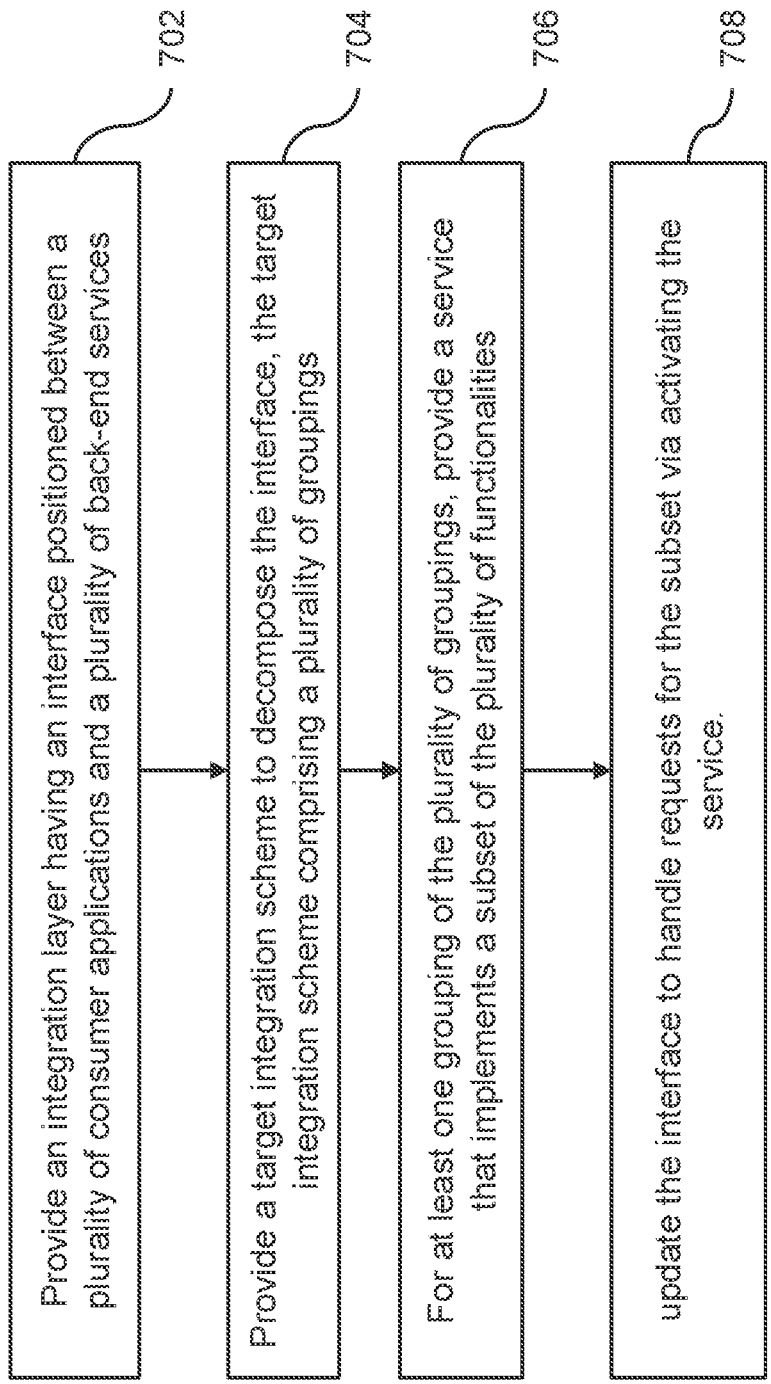
FIG. 7 shows a flow diagram of an example method performed by computer executable instructions for managing data from different data sources.

Referring to FIG. 7, a flow diagram of an example method performed by computer executable instructions (e.g., stored on a memory as described in FIGS. 4-6) for transitioning a computer integration system is shown. Furthermore, it is understood that references in FIG. 7 to elements of the preceding figures in this application are illustrative and are not intended to be limiting.

At block 702, an integration layer (e.g., layer 26) having an interface (e.g., interface 30) positioned between a plurality of consumer applications (e.g., consumer applications 24) and a plurality of back-end services (e.g., services 34) is provided. The interface performs a plurality of functionalities (e.g., routines 32). The term provided is understood to be used herein expansively, and can include being provided by a computing platform 20, downloaded onto a server, generated by developers, etc.

At block 704, a target integration scheme (e.g., as shown in FIG. 3) is provided to decompose the interface. The target integration scheme includes a plurality of groupings, where the groupings can represent enterprise units, grouped functionalities based on resources required, databases accessed, etc.

At block 706, for at least one grouping of the plurality of groupings, a service (e.g., service 38) is provided that implements a subset of the plurality of functionalities. The service 38 can be hosted on a computing platform different than the interface.

At block 708, the interface is updated to handle requests for the subset of functionalities via activating the service of block 706. Updating can comprise invoking the services, removing the code that implemented the functionality that now resides in the service, noting changes in the log, etc.

Blocks 706 and 708 can be iterated, such that services that implement different subsets of the plurality of functionalities for different groupings of the plurality of groupings are iteratively provided, decomposing the interface.

It is understood that the sequence shown in FIG. 7 is illustrative, and not limiting. For example, blocks 704 can occur before block 702, or block 702 can be completed in parallel to block 706, etc.

Figure 8:
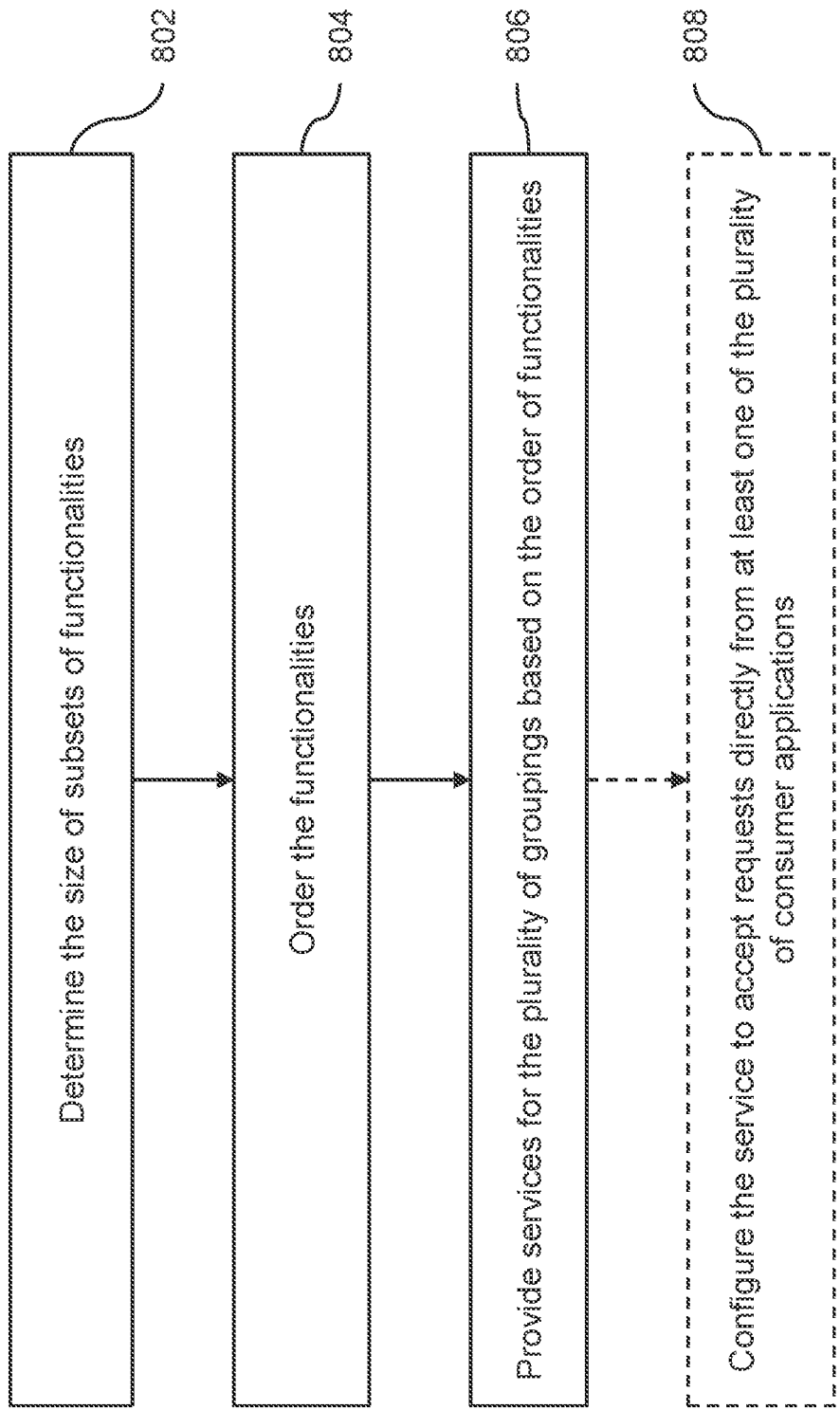
FIG. 8 shows a flow diagram of another example method performed by computer executable instructions for managing data from different data sources.

Referring to FIG. 8, a flow diagram of another example method performed by computer executable instructions (e.g., stored on a memory as described in FIGS. 4-6) for transitioning a computer integration system is shown. It is understood that references in FIG. 8 to elements of the preceding figures in this application are illustrative and are not intended to be limiting.

At block 802, a size of functionalities of each service in the groupings of the target integration scheme is determined. For example, it can be determined that a service 38 of a particular grouping requires a plurality of functionalities, whereas other services 38 can require one or relatively few functionalities.

In example embodiments, the size of the functionalities of each service is determined per grouping, in sequence, in parallel, etc.

At block 804, the services are sorted. The services can be sorted according to least functionality, or smallest functionality, being replaced, etc.

At block 806, the services are provided (e.g., in block 706) according to the sorting of block 804.

At block 808, optionally, the service is configured to accept requests directly from at least one consumer application. That is, services can be configured to request direct requests, or a plurality of services 38 can be provided to decompose the interface 30, and at some later time the services 38 can be configured to receive direct requests, if any configuration is required at all.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for transitioning a computer integration system, the system comprising:
   a processor; and
   a memory coupled to the processor, the memory storing computer executable instructions that when executed by the processor cause the system to:
      provide an integration layer having an interface positioned between a plurality of consumer applications and a plurality of back-end services, the interface performing a plurality of functionalities;
      provide a target integration scheme to decompose the interface, the target integration scheme comprising a plurality of groupings;
      iteratively provide a plurality of services in a predetermined order, wherein each service implements a different respective subset of the plurality of functionalities for at least one respective grouping of the plurality of groupings; and
      for each iteratively provided service, update the interface to handle requests for the respective subset via activating the respective service.

2. The system of claim 1, wherein the target integration scheme is a domain driven design, and the plurality of groupings are different domains.

3. The system of claim 1, wherein the service is configured to accept requests directly from at least one of the plurality of consumer applications.

4. The system of claim 3, wherein the instructions cause the system to:
   remove the interface in response to the services being configured to accept requests directly from the plurality of consumer applications.

5. The system of claim 1, wherein the interface is implemented by a first computing platform, and the service is implemented by a second computing platform.

6. The system of claim 1, wherein, to update the interface, the instructions cause the processor to remove code associated with the subset of the plurality of functionalities from the interface.

7. The system of claim 1, wherein the predetermined order is based on any one or more of: acceptable downtimes of functionalities in the respective subsets, numbers of functionalities in the respective subsets, and sizes of the respective subsets.

8. The system of claim 1, wherein the instructions cause the processor to update the service without impacting the interface.

9. The system of claim 1, wherein the plurality of functionalities comprises receiving application programming interface (API) calls from the plurality of consumer applications.

10. A method for transitioning a computer integration system, the method comprising:
    providing an integration layer having an interface positioned between a plurality of consumer applications and a plurality of back-end services, the interface performing a plurality of functionalities;
    providing a target integration scheme to decompose the interface, the target integration scheme comprising a plurality of groupings;
    iteratively providing plurality of services in a predetermined order, wherein each a service implements a different respective subset of the plurality of functionalities for at least one respective grouping of the plurality of groupings; and
    for each iteratively provided service, updating the interface to handle requests for the respective subset via activating the respective service.

11. The method of claim 10, wherein the predetermined order is based on any one or more of: acceptable downtimes of functionalities in the respective subsets, numbers of functionalities in the respective subsets, and sizes of the respective subsets.

12. The method of claim 10, wherein the interface is implemented by a first computing platform, and the service is implemented by a second computing platform.

13. The method of claim 10, wherein, to update the interface, the method comprises:
    removing code associated with the subset of the plurality of functionalities from the interface.

14. The method of claim 10, comprising configuring the service to accept requests directly from at least one of the plurality of consumer applications.

15. The method of claim 10, wherein the plurality of functionalities comprises receiving application programming interface (API) calls from the plurality of consumer applications.

16. The method of claim 10, comprising removing code associated with the subset of the plurality of functionalities from the interface.

17. The method of claim 10, comprising updating the service without impacting the interface.

18. A non-transitory computer readable medium for transitioning a computer integration system, the computer readable medium comprising computer executable instructions for:
    providing an integration layer having an interface positioned between a plurality of consumer applications and a plurality of back-end services, the interface performing a plurality of functionalities;
    providing a target integration scheme to decompose the interface, the target integration scheme comprising a plurality of groupings;
    iteratively providing plurality of services in a predetermined order, wherein each a service implements a different respective subset of the plurality of functionalities for at least one respective grouping of the plurality of groupings; and
    for each iteratively provided service, updating the interface to handle requests for the respective subset via activating the respective service.

19. The non-transitory computer readable medium of claim 18, wherein the predetermined order is based on any one or more of: acceptable downtimes of functionalities in the respective subsets, numbers of functionalities in the respective subsets, and sizes of the respective subsets.

20. The non-transitory computer readable medium of claim 18, wherein the target integration scheme is a domain driven design, and the plurality of groupings are different domains.

* * * * *